US006890279B2

(12) United States Patent
Ryberg

(10) Patent No.: US 6,890,279 B2
(45) Date of Patent: May 10, 2005

(54) WINDOW OPERATOR

(75) Inventor: Jesper Ryberg, Ølsted (DK)

(73) Assignee: VKR Holding A/S, Søborg (DK)

( * ) Notice: Subject to any disclaimer, the term of this patent is extended or adjusted under 35 U.S.C. 154(b) by 29 days.

(21) Appl. No.: 10/297,430

(22) PCT Filed: Jun. 8, 2001

(86) PCT No.: PCT/DK01/00394

§ 371 (c)(1),
(2), (4) Date: Dec. 6, 2002

(87) PCT Pub. No.: WO01/94732

PCT Pub. Date: Dec. 13, 2001

(65) Prior Publication Data

US 2003/0144104 A1 Jul. 31, 2003

(30) Foreign Application Priority Data

Jun. 9, 2000 (DK) .......................................  2000-00894

(51) Int. Cl.[7] ............................................. F16H 48/06
(52) U.S. Cl. ...................................... 475/149; 475/343
(58) Field of Search ................................ 475/149, 150, 475/343, 346; 49/337

(56) References Cited

U.S. PATENT DOCUMENTS

| | | | |
|---|---|---|---|
| 2,582,690 A | | 1/1952 | Franz |
| 3,848,477 A | * | 11/1974 | Giandinoto et al. ........... 74/425 |
| 4,040,307 A | | 8/1977 | Koster |
| 5,089,736 A | * | 2/1992 | Oyafuso ..................... 310/90 |
| 5,271,182 A | | 12/1993 | Greisner et al. |
| 5,493,813 A | * | 2/1996 | Vetter et al. .................. 49/341 |
| 5,791,204 A | * | 8/1998 | Torii et al. ..................... 49/334 |
| 5,823,905 A | * | 10/1998 | Torii et al. ................... 475/149 |
| 5,907,139 A | * | 5/1999 | Fukatsu et al. ............. 475/149 |
| 6,162,142 A | * | 12/2000 | Hori et al. ................... 475/149 |
| 6,352,006 B1 | * | 3/2002 | Kurashita .................... 74/409 |
| 6,629,905 B1 | * | 10/2003 | Sesselmann et al. ........ 475/149 |

FOREIGN PATENT DOCUMENTS

| | | |
|---|---|---|
| DE | 18 07 553 | 6/1970 |
| EP | 0 270 159 | 6/1988 |
| EP | 0 563 583 | 10/1993 |
| EP | 0 964 185 | 12/1999 |
| FR | 2 311 236 | 5/1976 |
| FR | 2 538 063 | 6/1984 |
| GB | 733 827 | 6/1955 |
| GB | 2 054 735 | 2/1981 |
| WO | WO 97/43564 | 11/1997 |

OTHER PUBLICATIONS

W.W. Michalec, Antibacklash Devices, Machine Design, vol. 27, No. 2, Feb. 1, 1955, pp. 206.

* cited by examiner

*Primary Examiner*—Dirk Wright
(74) *Attorney, Agent, or Firm*—Merek, Blackmon & Voorhees, LLC

(57) ABSTRACT

A window operator with means for electric operation of windows and comprising a magazine (8, 9) for an opening member (80), a drive member (10) for the opening member (80), an electric motor (5) and a worm gear (15, 40) coupled with the shaft (41) of the motor. A preferably static self-locking reduction gear is inserted between the worm gear (40, 15) and the drive member (10). The worm (40) and the worm wheel (15) of the worm gear are furthermore supported so that their respective axes of rotation (41, 63) are mutually movable.

24 Claims, 2 Drawing Sheets

WINDOW OPERATOR

Figure 1:
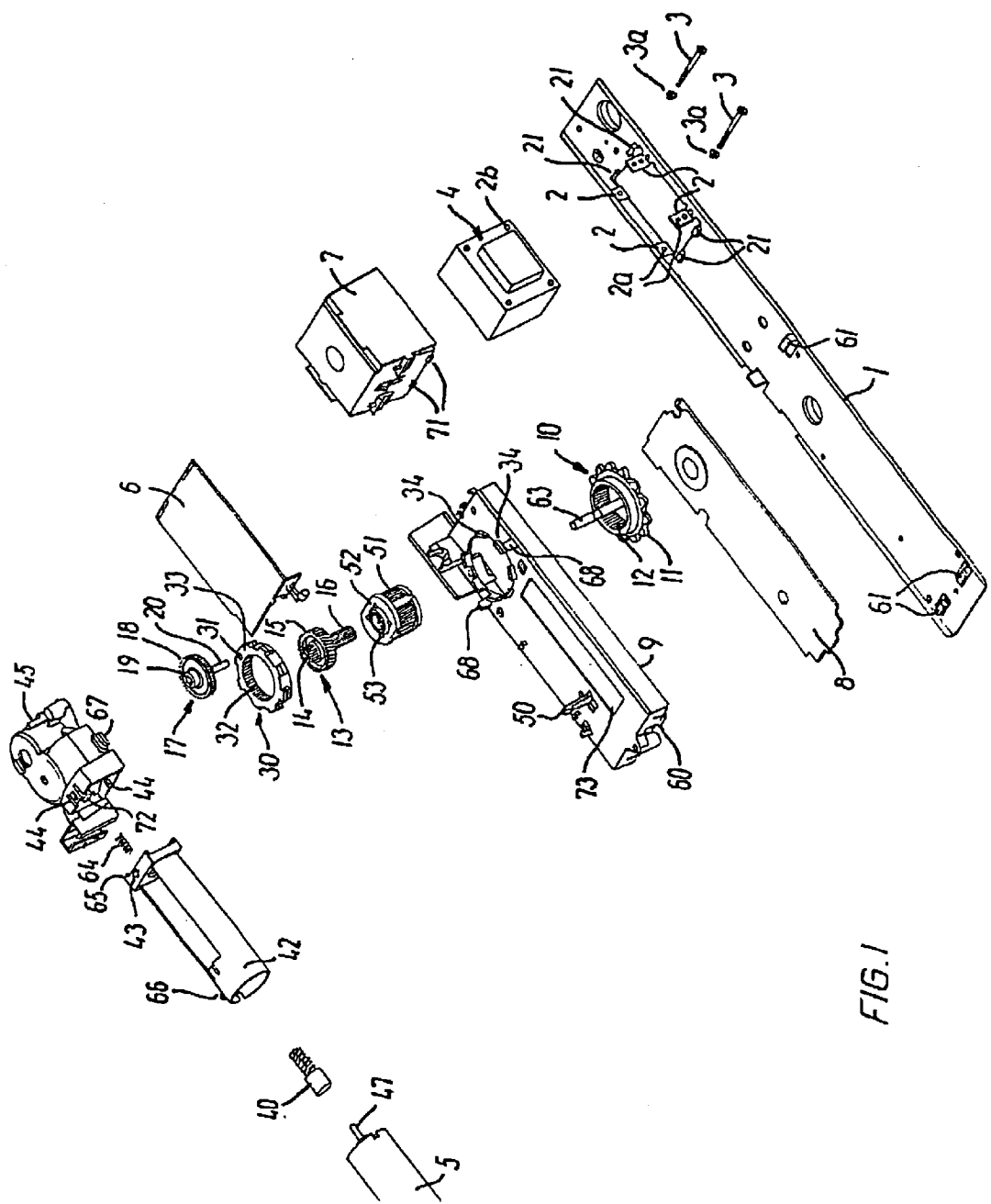

The present invention generally relates to a window operator with means for electric operation of windows and comprising a magazine for an opening member, a drive member for the opening member, an electric motor and a worm gear coupled with the shaft of the motor, a preferably static self-locking reduction gear being inserted between the worm gear and the drive member, and particularly to the reduction of noise in such window operator.

Window operators of the type mentioned in the introduction are widely used for opening and closing windows, for example, where they are located in an inaccessible place, or where they are part of a context, in which it is practical to operate a large number of windows together or dependent on each other.

Prior art includes electric window operators which comprise a housing or a magazine in which an opening member for the window is stored. The opening member is typically a chain which is only flexible in one direction. One end of the opening member is connected to the window, while the other ends in the housing in such a way that the opening member, when the window is closed, is stored in a wound-up manner in the housing. When the window is to be opened, the chain is run out of the housing by means of a drive mechanism comprising a chain wheel engaging with the opening member. The window thus opens.

However, as the window should preferably remain in the open position until it is desired to close it, it is necessary with some form of lock in the mechanism.

A simple and efficient way of achieving this lock is to use a self-locking worm gear inserted somewhere between the electric motor and the chain wheel. This solution is described in U.S. Pat. No. 5,271,182.

It is not always desirable, however, to use a self-locking worm gear in this place. This applies, for example, when, in addition to the electric operation, the possibility of manual operation of the window is wanted, so that in case of a power failure the window can be operated manually. This might be wanted, for example in connection with a fire, as experience shows that fires often result in power failures. In that case, if no special precautions were taken, the self-locking worm gear would lock the mechanical operation, which would prevent the window from being used as an escape route.

If a self-locking worm gear is not used, it is consequently necessary to provide some form of lock. Here, a friction lock may be used, for example.

However, it is undesired to have a higher friction than at all necessary, as this necessarily involves a friction loss during the movement of the window by the operator with a resulting reduction in the efficiency of the system. Such friction would be a disadvantage particularly for opening of the window, as the motor would then have to overcome both the frictional forces and gravity.

Another possibility is to short-circuit the electric motor when it is not in operation, as the energy supplied to the window by external forces will then be dissipated in the load on the motor constituted by the short-circuit and therefore immediately brake the window.

Furthermore a friction lock can advantageously be used, where the static friction in the system is sufficient to keep the window in the open position against forces from gravity and wind pressure on the window, but where the dynamic friction is so much lower than the static friction that forces from gravity and wind pressure on the window can by themselves keep a started movement going without any proper tractive force from the motor. Such lock is called a static lock below.

The latter option can advantageously be combined with the above short-circuiting of the electric motor in order to ensure that the window does not suddenly start moving owing to external forces such as wind pressure or a touch. Such move would be undesired as, once started, the movement will continue by itself until the window is closed, which is directly contrary to intentions.

In connection with the development of the present invention it has surprisingly turned out that special problems in the form of noise occur if a non-self-locking worm connection is used in connection with a lock of the above type with a static self-locking mechanism, as in such window operators a rattling noise occurs which may be bothering for persons in the surroundings of the operator.

This noise substantially only occurs when the motor is in load cooperation with the window, that is, when the gravity on the window causes a torque in the same direction as the torque output by the motor.

An analysis of the problem shows that the noise is associated with the statically self-locking nature of the lock and the clearance which is normally provided between worm and worm wheel in consideration of the efficiency of the worm gear.

It is assumed that the following mechanism plays an important part in the production of the rattling noise by the worm gear.

When the window is lowered, the gravity and the wind pressure on the window will normally be expected to apply a torque to the worm wheel that turns the worm wheel so that a tooth flank is always in contact with the worm.

However, this is not the case when, as mentioned above, a static friction lock is used, as in this situation the static friction is sufficient to keep the worm wheel in place when there is no external influence.

Thus, the worm being driven by the motor, when the worm is in load cooperation, one tooth flank of the worm turns away from the tooth flank with which it is in contact and onwards towards the flank forming the back of the next tooth while the worm wheel stands still. When the worm has then turned so much that its other tooth flank reaches the flank that forms the back of the next tooth, the worm will start turning the worm wheel. This thereby triggers a movement which, because the dynamic friction has a lower value than the static friction, can be kept going by gravity and the wind pressure on the window. Presumably, this movement is not only kept going, but is accelerated by the force from the window so that the worm wheel is turned forwards until it hits the said one tooth flank of the worm and thus produces sound. However, this stops the movement of the worm wheel, and the worm wheel therefore stands still because of the static friction in the system until, owing to the further turning of the worm, it is hit again, whereupon the process repeats itself. These repeated abutments against the worm are assumed to produce the rattling sound.

Various methods of absorbing such clearance are known. Thus, patent literature includes the publications FR-A-2 311 236, EP-A-270 159, DE-A-18 07 553, FR-A-2 538 063 and U.S. Pat. No. 2,582,690, which discuss absorption of clearance in worm gears. Common to these publications is that the worm shaft is hinged so that the worm can turn into deeper meshing engagement with the gearing of the worm wheel.

A similar system with a hinged worm shaft is known from Machine Design, February 1955, page 206. Here it is mentioned that the spring bias is so strong that it forces the worm into close contact with the worm wheel. It is stated that the continuous spring bias is undesired as a great deal of friction occurs in the meshing engagement. It is also stated as a disadvantage that the bearings of the worm shaft have to be movable.

However, in connection with window operators, such strong spring bias is not desired as the increased friction entailed thereby would be an obstacle when the motor has to move the window against gravity via the worm gear drive. In that case the motor and any power-failure backup system have to be dimensioned larger than if the worm was provided with a fixed axis, set so that the meshing engagement was optimum in terms of force transmission, that is, had the best possible efficiency.

However, compared with the teaching of these publications it has surprisingly turned out that special advantages are obtained through the use of such a pivotably supported worm in connection with the desired static self-locking.

Viz., approximately optimum efficiency when in load counteroperation and lack of noise when in load cooperation.

The above noise problem in a window operator with means for electric operation of windows and comprising a magazine for an opening member, a drive member for the opening member, an electric motor and a worm gear coupled with the shaft of the motor, a preferably static self-locking reduction gear being inserted between the worm gear and the drive member, is thus solved by the worm and the worm wheel of the worm gear being supported so that their respective axes of rotation are mutually movable.

In an advantageous embodiment of the invention, the worm is supported pivotably about a pivot axis which preferably is essentially parallel with the axis of the worm wheel.

In a simple manner this allows the worm, when in load cooperation, to work itself into meshing engagement with the gearing of the worm wheel so that both flanks of a tooth in the gearing of the worm wheel come into contact with respective flanks of the worm and thus absorb the clearance that gives rise to the noise in this situation.

It is particularly advantageous if the pivot axis lies between the axis of rotation of the worm and the axis of rotation of the worm wheel.

This results in the worm in load cooperation by itself working into meshing engagement with the gearing without a spring bias being necessary as such, whereas, in load counteroperation, the worm will work outwards in a direction away from engagement with the worm wheel.

In this connection it is advantageous if means are provided to prevent the worm from pivoting out of engagement with the worm wheel, as it will then be possible to keep the worm in meshing engagement with the worm wheel in a position providing optimum efficiency.

It is in design advantageous if the worm together with the motor and its motor shaft is supported pivotably about a pivot axis which is essentially parallel with the axis of the worm wheel. This provides support of the worm without the use of other bearings than those already found in the motor.

This support can advantageously be provided by the window operator comprising a holder journalled pivotably about the axis parallel with the axis of the worm wheel, in which holder the electric motor with the motor shaft and the worm are placed.

It is advantageous if the preferably static self-locking reduction gear is a planetary gear, the sun wheel of which comprises the worm wheel. This provides a compact design of the gear.

In yet an advantageous embodiment, the planetary gear is a Wolfrom gear. In a simple manner this achieves a resulting slow speed of rotation for the output of the planetary gear, that is, the ring gear, compared with the speed of rotation of the motor.

In an advantageous embodiment, the Wolfrom gear has a gear ratio larger than 50:1, preferably 65:1, as this gear ratio contributes to ensuring that the desired static self-locking is achieved.

For the sake of compactness, it is an advantage if the drive member of the opening member comprises a ring gear for the planetary gear.

This can be realised in a particularly practical manner by the opening member being a chain and the drive member for the opening member comprising an external gearing engaging with the opening member.

It is particularly advantageous if the window operator also comprises means for manual operation and the sun wheel of the planetary gear is adapted to cooperate with both the electric motor and the means for manual operation.

This provides a simple, robust and compact design which permits the manual operation of the window operator.

Another aspect of the invention also solves the noise problem by using a pivotably supported worm for noise reduction in a window operator with a worm gear.

In this aspect of the invention it is advantageous if the worm of the worm gear together with an electric motor and its motor shaft is supported pivotably about an axis which preferably is essentially parallel with the axis of the worm wheel, in a window operator comprising a magazine for an opening member, a drive member for the opening member, an electric motor with the shaft of the motor and a preferably static self-locking reduction gear inserted between the worm gear and the drive member.

In yet another aspect of the invention, the noise problem is solved by a method of reducing noise in a worm gear in a window operator comprising a magazine for an opening member, a drive member for the opening member, an electric motor, the worm gear being coupled to the shaft of the motor, the worm preferably being mounted on the motor shaft, and a preferably static self-locking reduction gear being inserted between the worm gear and the drive member, which method is characterized in that the motor with the worm mounted on the motor shaft is supported pivotably about an axis which preferably is essentially parallel with the axis of the worm wheel in such a manner that, depending on the direction of rotation of the motor, the worm can pivot between a first position in which the worm meshes into a tooth space of the worm wheel and thus absorbs the clearance, and a second position in which the worm only abuts the respective same side of the teeth of the worm wheel.

Figure 2:
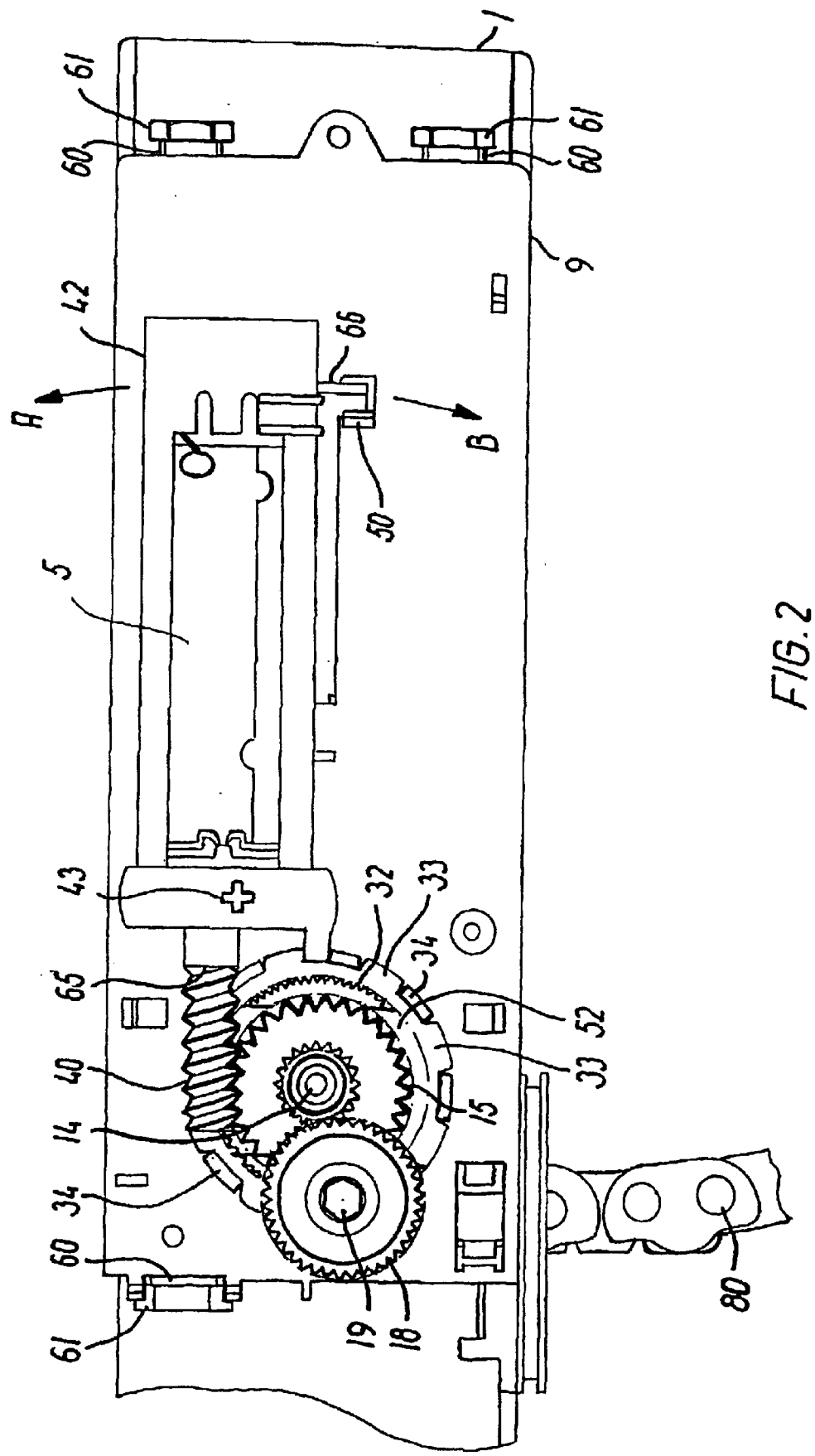

An example of the invention will now be described in detail below, illustrated by an embodiment thereof, with reference to the drawing, in which FIG. 1 shows an exploded view of a window operator according to the invention mounted on a base plate and in connection with electronic control components, and FIG. 2 is a plane view of the window operator according to the invention in a partially assembled state.

FIG. 1 shows a modular window operator. The entire window operator is built upon a shaped base plate 1, which may, for example, be a galvanized steel plate shaped through a combination of stamping, punching and/or folding.

By stamping and folding of the base plate, a number of tabs 2 with through holes 2a have been provided, corresponding to through holes 2b in a transformer 4, through which holes 2a, 2b the transformer 4 for supplying an electric motor 5 can be fastened by means of screws 3 and plastic bushings 3a in such a manner that the transformer 4 is isolated from the base plate 1. The motor 5 is powered by the transformer 4 via wires, not shown, and control electronics, not shown, placed on a printed circuit board 6.

To cover the transformer 4, a transformer housing 7 is provided, and it can be retained in stamped-out holes 21 provided in the base plate by means of resilient projections 71.

A sliding plate 8 rests on the base plate and, together with a housing 9, houses an opening member 80 which preferably has the form of a chain 80 as shown in FIG. 2.

The opening member is stored in an approximately spiral-shaped groove, not shown, in the housing 9. The opening member 80 meshes with a drive member 10 so that the drive member 10 can drive the opening member 80 out of and into the housing 9.

The drive member 10 is designed with two gearings, viz., an external gearing 11 constituting the teeth of a chain wheel 11 and an internal gearing 12 constituting the ring gear 12 of a planetary gear. The drive member 10 also comprises a shaft 63, which is fixed in relation thereto, and on which a sun wheel member 13 is journalled.

The sun wheel member 13 comprises three coaxial gearings. A first gearing 16 constituting the sun wheel 16 of the planetary gear, a second gearing 15 constituting the worm wheel 15 of a worm gear, and a third gearing 14 cooperating with an operating gearwheel 17 for use in manual operation.

The sun wheel member 13 may be made in one piece. It may, however, also advantageously be formed in two parts so that the first and third 14 gearings are, in practice, the same gearing on a through gearwheel on which the worm wheel 15 is inserted in a rotationally secure manner, the worm wheel in that case having an internal gearing corresponding to the first and the third gearings 16, 14.

In that connection the operating gearwheel 17 has a gearing 18 corresponding to the third gearing 14 of the sun wheel member. Furthermore, the operating gearwheel 17 has a hexagonal recess 19 in which a suitable tool or operating member can be inserted for the purpose of manual operation. Moreover, the operating gearwheel 17 comprises a shaft 20 fixed in relation to the operating gearwheel 17 itself. Although the embodiment shown provides a hexagonal recess for cooperating with the operating member it is, of course, possible to use other means, such as a projecting one. For these, also other polygonal shapes than hexagonal can be used. Furthermore, protruding hooks or eyelets can be used.

The fixed shaft 20 of the operating gearwheel is rotatably journalled in a suitable bore 31 in a radial projection 32 of an annular member 30.

In addition to the bore 20, the annular member 30 also has an internal gearing 32 and a number of projections 33 spaced along the periphery.

The projections 33 are formed so that they fit into engagement with projections 34 on the housing so that the annular member 30 is secured against rotation in relation thereto.

The internal gearing 32 in the annular member 30 deviates slightly from the internal gearing 12 in the ring gear member 10. This is to mean that the teeth of the respective gearings 32 and 12 are of substantially the same size, but that there is a small difference in the number of teeth and the tooth profile, for example 62 teeth in the gearing 12 in the ring gear member 10, and 58 teeth in the gearing 32 in the annular member 30.

This difference is so small that both these gearings 12 and 32 can cooperate with the same gearing of respective planet wheels 51. In the example shown, there are four planet wheels 51 in a planet wheel holder 52. These four planet wheels are rotatably journalled on four shafts 53, which are fixed in relation to the planet wheel holder 52.

The planet wheels 51 have a length which is adapted so that their gearing 51 at one end is in meshing engagement with the gearing 12 in the ring gear member 10 and at the other end is in meshing engagement with the gearing 32 in the annular member 30.

This provides a large reduction gear ratio, as for each rotation of the planet wheel holder 52, the ring gear member 10 will merely be displaced by four teeth corresponding to the difference between the gearings 12 and 32.

If, for the sake of ease, it is assumed that the sun wheel 16 and the planet wheels 51 have the same diameter, viz., one third of the internal diameter of the ring gear, a reduction gear ratio in the order of 3×58:4=174:4 is obtained, as a planet wheel then has to use three sun wheel rotations to complete a course along the teeth of the annular member 58, whereupon, due to the tooth difference, the ring gear member 10 will have turned four teeth in relation to the fixed annular member 30.

This, however, is only to illustrate the order of the gear ratio, and in practice other ratios between sun wheel, planet wheel, the ring gear member 10 and the annular member 30 are possibble. Thus, in a preferred embodiment, the gear ratio is larger than 50:1 and preferably 65:1. It should be noted in this connection that the above gear ratios must be understood to mean that 50 or 65 revolutions, respectively, of the sun wheel member 13 result in one revolution of the ring gear 12.

In addition to the reduction gear in the form of the planetary gear described above, which is also designated a Wolfrom gear, there is a reduction gear in the form of a worm gear, viz., the worm gear of which the worm wheel 15 described above forms part.

This worm gear has a worm 40, which meshes with the worm wheel 15.

This worm 40 is mounted on the motor shaft 41 in the electric motor 5.

The electric motor 5 is mounted in a substantially cylindrical holder 42. The holder 42 is provided with a pair of projections 43 which are in engagement with a pair of corresponding holes 44 in a gear housing 45 so that the two projections 43 form a shaft which provides a pivot axis for the holder 42 and thus for the motor 5 and the motor shaft 41 with the worm 40.

The holder 42 can thus pivot about a pivot axis through the projections 43, which makes the engagement between the worm 40 and the worm wheel 15 variable. For reasons of space a recess 73 in the housing 9 has been provided to allow the holder 42 with the motor 5 to pivot freely.

These projections 43 are offset slightly in relation to the motor shaft 5, viz., so that the pivot axis lies between the motor shaft 5, which forms the axis of rotation of the worm 40, and the sun wheel 16 in the planetary gear.

FIG. 2 shows the window operator according to the invention in a partially assembled state, the gear housing 45 having been removed in consideration of the illustration.

FIG. 2 shows the base plate 1. On the base plate 1, the housing 9 is fastened by means of a number of resilient projections 60, which are provided on the housing 9, and which are in engagement with cut-outs 61 in the base plate, that is, corresponding to the manner in which the transformer housing 7 is retained in the cut-outs 21 by means of the resilient projections 71.

FIG. 2 further shows the annular member 30, the radial projections 32 of which secure it against rotation in relation to the housing 9, as the radial projections 33 engage with projections 34 provided on the housing 9. The projections 34 on the housing 9 are provided as axial projections in relation to the annular member 30.

The sun wheel holder 52 is shown inserted in the annular member 30, and the sun wheel member 13 is in turn shown inserted in the sun wheel holder 52 with the worm wheel 15 and the end carrying the third gearing 14 being visible.

The operating gearwheel 17 with the gearing 18 in mesh with the third gearing 14 on the sun wheel member is shown inserted in the bore 31, not visible in FIG. 2, in the annular member 30.

FIG. 2 also shows the substantially cylindrical holder 42 in a position in which it might be if the gear housing 45, which fully and completely carries the holder 42, were put in place. For reasons of illustration the holder 42 and the parts mounted therein are thus included in the Figure as were it mounted in the gear housing 45 not shown in FIG. 2.

In this connection it should be mentioned that the gear housing 45 is provided with eyelets 67, which can cooperate with suitable resilient projections 68 provided on the housing 9 and permitting the gear housing 45 to be snap-fitted into place on the housing 9.

As mentioned above, the pivot axis through the projections 43 is offset slightly in relation to the motor shaft 41, viz., towards the axis of rotation 63 of the worm wheel 15.

It has turned out that an offset in this direction surprisingly provides some advantages with respect to the pivot movement of the worm 40 depending on the direction of rotation.

It has actually turned out that if the pivot axis is offset in a direction towards the axis of rotation of the worm wheel 15 instead of intersecting the motor shaft 41, the worm 40 will by itself tend to mesh more deeply with the worm wheel 15, whereas in load cooperation it will try to work itself out of engagement with the worm wheel 15. In FIG. 2, this is illustrated by the arrows A and B, respectively. Thus, biassing means, as they are described in prior art, are not strictly necessary. In the embodiment of the invention described, however, biassing means have nevertheless been provided in the form of a compression spring 64 to ensure meshing engagement between worm 40 and worm wheel 15. The compression spring is inserted in a suitable cylindrical seat 72 provided inside the gear housing 45 so that, when the holder is in place with the projections 43 in the openings 44 of the gear housing 45, the compression spring is compressed between the holder 42 and the gear housing 45. This achieves a torque which will seek to turn the worm 40 into deep meshing engagement with the worm wheel 15. Furthermore, the design aims to achieve a position of the holder 42 with the motor 5 that will make gravity contribute with a torque in the same direction as the compression spring 64 in the normal mounting situation of the window operator.

When the motor 5 and thus the worm 40 cooperate with the load, the worm 40 will tend to work itself out of engagement with the worm wheel 15, corresponding to the holder 42 pivoting in the direction of the arrow B. The biassing spring 64 will not be able to prevent this effect, being too weak for this. However, this is also quite unproblematic and on the contrary even desirable, as the result is that in load counteroperation, when the efficiency of the system is particularly important, the worm can be made to engage optimally in that respect through suitable stop means 65, 50 and 66 provided for the holder 42.

This shift between deep meshing engagement which absorbs the clearance when the worm is in load cooperation, and less deep meshing engagement which optimizes the efficiency, can take place in both directions of rotation of the motor 5, provided that a shift from load cooperation occurs. And this is just the case with the window operator.

Here, the worm will be in load counteroperation when the window operator works against gravity during the opening movement of the window. When the window is to be closed, the window operator will work with the gravity on the window during most of the closing movement, that is, cooperate with the load. Normally, at the end of the closing movement, a certain packing pressure between the frame and the sash of the window will have to be overcome. This thus means that there is a shift from load cooperation and low efficiency to load counteroperation and high efficiency, although the direction of rotation of the motor 5 is unchanged. In this situation, its cylindrical housing 42 and the motor 5 with the motor shaft 41 and the worm 40 mounted thereon will pivot in direction B away from the deep meshing engagement and out towards the optimum meshing engagement where the pivot movement is stopped by the stop means 50, 66 and 65. The holder 9 thus pivots in the direction of arrow B until the projection 66 hits the stop 50, and until the projection 65 hits the inside wall of the gear housing on which the seat 72 of the compression spring 64 is located.

Thereby, the worm 40 will thus quite automatically pivot outwards for optimum meshing engagement, in terms of efficiency, with the worm wheel 15 at the moment when the motor 5 needs to overcome the packing pressure.

It should be mentioned that although the point of departure of the preceding description is that the window is opened against and closed with gravity, the opposite situation can also be imagined. However, this makes no difference to the noise problems as such, but only to the time when they occur.

It should also be mentioned that although the invention is described for an embodiment where the means for the static self-locking are provided in the form of a Wolfrom gear, the person skilled in the art will understand that this static self-locking can be provided in other ways and at other locations in the system without affecting the actual problem of noise, which is the basis of the invention. It should also be mentioned that the above noise problems can also occur when the Wolfrom gear is used in connection with a self-locking worm connection and thus be remedied in a corresponding manner according to the invention.

What is claimed is:

1. A window operator for electric operation of windows, said window operator comprising
   a magazine for an opening member, a drive member for the opening member, an electric motor having a shaft, a worm gear coupled with the shaft of the motor, and a reduction gear inserted between the worm gear and the drive member, wherein
   the worm gear comprises a worm rotatable about a first axis of rotation and a worm wheel rotatable about a second axis of rotation, the worm and the worm wheel of the worm gear being supported so that the first and second axes of rotation are mutually movable.

2. A window operator according to claim 1, wherein the reduction gear is a static self-locking reduction gear.

3. A window operator according to claim 1, wherein the worm is supported pivotably about a pivot axis, which is essentially parallel with said second axis of rotation.

4. A window operator according to claim 3, wherein the pivot axis lies between the axis of rotation of the worm and said second axis of rotation.

5. A window operator according to claim 3, wherein the worm together with its motor and the motor shaft is supported pivotably about a pivot axis, which is essentially parallel to said second axis of rotation.

6. A window operator according to claim 1, wherein the worm is biased so as to force the worm in a direction towards meshing engagement with the worm wheel.

7. A window operator according to claim 1, wherein stops are provided to prevent the worm from pivoting out of engagement with the worm wheel.

8. A window operator according to claim 1, wherein the static self-locking reduction gear is a planetary gear, the sun wheel of which comprises the worm wheel.

9. A window operator according to claim 7, wherein the sun wheel of the planetary gear is adapted to cooperate both with the electric motor and a device for manual operation.

10. A window operator according to claim 3, further comprising a holder journalled pivotably about the axis parallel to said second axis of rotation, in which holder the electric motor with the motor shaft and the worm are placed.

11. A window operator according to claim 8 wherein the planetary gear is a Wolfrom gear.

12. A window operator according to claim 11, wherein the planetary gear is a Wolfrom gear with a gear ratio larger than 50:1.

13. A window operator according to claim 11, wherein the planetary gear is a Wolfrom gear with a gear ratio larger than 65:1.

14. A window operator according to claim 9, wherein the drive member of the opening member comprises a ring gear for the planetary gear.

15. A window operator according to claim 1, wherein the opening member is a chain, and the drive member for the opening member comprises an external gearing engaging with the opening member.

16. The use of a pivotably supported worm for noise reduction in a window operator with a worm gear comprising said worm, wherein the worm of the worm gear comprises a first axis of rotation about which it is rotatable together with a shaft of an electric motor, wherein the worm and the shaft of said motor are journalled pivotably about a pivot axis arranged in parallel with a second axis of rotation about which a worm wheel meshing with the worm is rotatable, said window operator further comprising a magazine for an opening member, a drive member for the opening member and a static self-locking reduction gear inserted between the worm gear and the drive member.

17. Use according to claim 16, wherein the self-locking reduction gear is a planetary gear.

18. Use according to claim 17, wherein the planetary gear is a Wolfrom gear.

19. Use according to claim 18, wherein the Wolfrom gear has a gear ratio larger than 50:1.

20. Use according to claim 16, wherein the planetary gear comprises a sun wheel adapted to cooperate with both the electric motor and a manual operation device.

21. A method of reducing noise in a worm gear in a window operator, said window operator comprising a magazine for an opening member, a drive member for the opening member, an electric motor having a shaft on which a worm of said worm gear is mounted so as to be rotatable about a first axis of rotation, said worm engaging a worm wheel which is rotatable about a second axis of rotation, and a static self-locking reduction gear inserted between the worm gear and the drive member, wherein the motor with the worm mounted on the shaft thereof is pivotably supported in such a manner about a pivot axis in parallel with said second axis of rotation about which the worm wheel is rotatable that, depending on the direction of the motor, the worm can pivot between a first position in which the worm meshes into tooth space of the worm wheel and thus absorbs the clearance, and a second position in which the worm only abuts the respective same side of the teeth of the worm wheel.

22. A method according to claim 21, wherein the stops are provided for correct positioning in the second position.

23. A method according to claim 21, wherein the pivotably supported motor with the worm mounted on the shaft thereof is biased, so as to ensure the correct meshing of the worm in the tooth space of the worm wheel in the first position.

24. The use of a pivotably supported worm for noise reduction in a window operator with a worm gear comprising said worm wherein the worm has an axis of rotation and a pivotable support axis and the pivotable support axis is generally transverse to the axis of rotation.

* * * * *